United States Patent [19]
Yaron

[11] Patent Number: 5,901,737
[45] Date of Patent: May 11, 1999

[54] ROTARY VALVE HAVING A FLUID BEARING

[76] Inventor: Ran Yaron, 1035 Golden Way, Los Altos, Calif. 94024

[21] Appl. No.: 08/668,915

[22] Filed: Jun. 24, 1996

[51] Int. Cl.⁶ .............................. F16K 5/22; F16K 39/00
[52] U.S. Cl. .............................. 137/246.12; 137/246.23; 251/283; 384/107
[58] Field of Search ............................ 251/283, 355; 137/246.12, 246.23; 384/107, 108, 109

[56] References Cited

U.S. PATENT DOCUMENTS

| | | | |
|---|---|---|---|
| 619,594 | 2/1899 | Martin | 251/283 X |
| 2,707,613 | 5/1955 | Wheatley | 251/283 X |
| 3,205,668 | 9/1965 | Gifford | 62/6 |
| 3,443,593 | 5/1969 | Colombo | 251/283 X |
| 3,490,819 | 1/1970 | Greenberg | 384/107 X |
| 3,625,015 | 12/1971 | Chellis | 62/6 |
| 3,692,041 | 9/1972 | Bondi | 137/246.12 X |
| 3,747,639 | 7/1973 | Eickmann | 251/283 X |
| 4,193,644 | 3/1980 | Miyashita et al. | 384/107 |
| 4,372,338 | 2/1983 | Efferson | 137/246.12 X |
| 5,335,505 | 8/1994 | Ohtani et al. | 62/6 |
| 5,412,952 | 5/1995 | Ohtani et al. | 62/6 |

*Primary Examiner*—John Rivell
*Attorney, Agent, or Firm*—Frank H. Foster; Kremblas, Foster, Millard & Pollick

[57] ABSTRACT

An improved rotary valve having a gas bearing which prevents contact between the rotating piston and the cylindrical housing. The same working gas which the rotary valve controls is accumulated in an accumulation chamber. Fluid flow passageways, having a fixed flow resistance along their length, connect the accumulator chamber with a plurality of cavities formed on the cylinder wall of the housing. Pressurized gas is thereby pumped into the clearance gap between the piston wall and the cylinder wall, increasing in pressure where the piston wall comes closer to the cylinder wall, and decreasing in pressure where the clearance gap increases. The net effect is a centering force applied to the piston whenever it varies from an equilibrium position.

7 Claims, 3 Drawing Sheets

5,901,737

ROTARY VALVE HAVING A FLUID BEARING

TECHNICAL FIELD

This invention relates to the field of fluid lubrication, and more specifically to gas bearings for rotary valves having component surfaces sliding in close proximity to one another.

BACKGROUND ART

In pulse tube cryocoolers of the Gifford-McMahon type, and other devices, rotary valves are used to control the flow of pressurized gas from a pressure source, such as a compressor, into the cryocooler. Rotary valves also control the flow of gas from the cryocooler back to the compressor. Valves of this sort are described in U.S. Pat. No. 3,205,668 to Gifford and U.S. Pat. No. 3,625,015 to Chellis. U.S. Pat. Nos. 5,335,505 and 5,412,952 to Ohtani et al. disclose Pulse Tube Refrigerators.

Rotary valves have a cylindrical piston which is rotatingly driven within a cylindrical sleeve. Multiple ports on both the piston and the sleeve register with one another at different points in the revolution of the piston. It is during this registration that pressurized gas is directed from one port to another, and therefore from a source to a predetermined destination.

During operation of a rotary valve in a pulse tube cryocooler of the Gifford-McMahon type, the valves rotate at about two revolutions per second. In order to properly seal the valve to prevent pressurized gas from flowing where it should not, the surfaces slide in relatively close proximity to one another causing substantial wear. Some conventional rotary valves have a rotating disc at one longitudinal end which is forced, by the high pressure gas, against the flat surface of the valve's housing. This disc seals the flow of gas, but due to the direct contact of the disc to the housing, substantial wear occurs. Typically, one of the two surfaces is made of a low friction material such as tetrafluoroethylene and the other is made of a hard material such as hardened steel. This type of seal typically wears out within one year of continuous operation.

The need exists for a rotary valve which requires less frequent replacement.

BRIEF DISCLOSURE OF INVENTION

The invention is an improved rotary valve for controlling the flow of a fluid from a fluid pressure source. The valve includes a piston rotating within a cylindrical bore formed in a housing, and an interfacing clearance gap between a piston wall and a cylinder wall. The invention has a fluid flow passageway connected to the fluid pressure source, and first and second cavities formed in the cylinder wall. The cavities communicate with the fluid in the fluid flow passageway, and open into the clearance gap for pumping the fluid from the fluid pressure source through the fluid flow passageway, out of the cavities, into and through the clearance gap.

It is preferred that there are multiple cavities, each connected to one or more fluid flow passageways, and spaced equiangularly from one another around the circumferential surface of the cylinder wall. At least one cavity is preferably formed at each opposite longitudinal end of the cylinder wall. When the piston wall moves closer to one side of the cylinder wall than the opposite, the pressure at the cavity near where the clearance gap is decreasing will increase. This increasing pressure forces the piston away from the cylinder wall at the decreasing clearance gap. At the opposite side, where the clearance gap is increasing, the pressure decreases, decreasing the force of the fluid on the piston, permitting the piston to be forced away from the cylinder wall where the clearance gap is decreasing.

It is preferred, for this centering effect to be optimal, that fluid flow passageways have a resistance within a predetermined range. Since the clearance gap has a minimum and a maximum resistance to fluid flow through the clearance gap, the resistance to the flow of fluid through the fluid flow passageway is preferably within a range extending from substantially the minimum resistance to fluid flow through the clearance gap to substantially the maximum resistance to fluid flow through the clearance gap.

Figure 1:
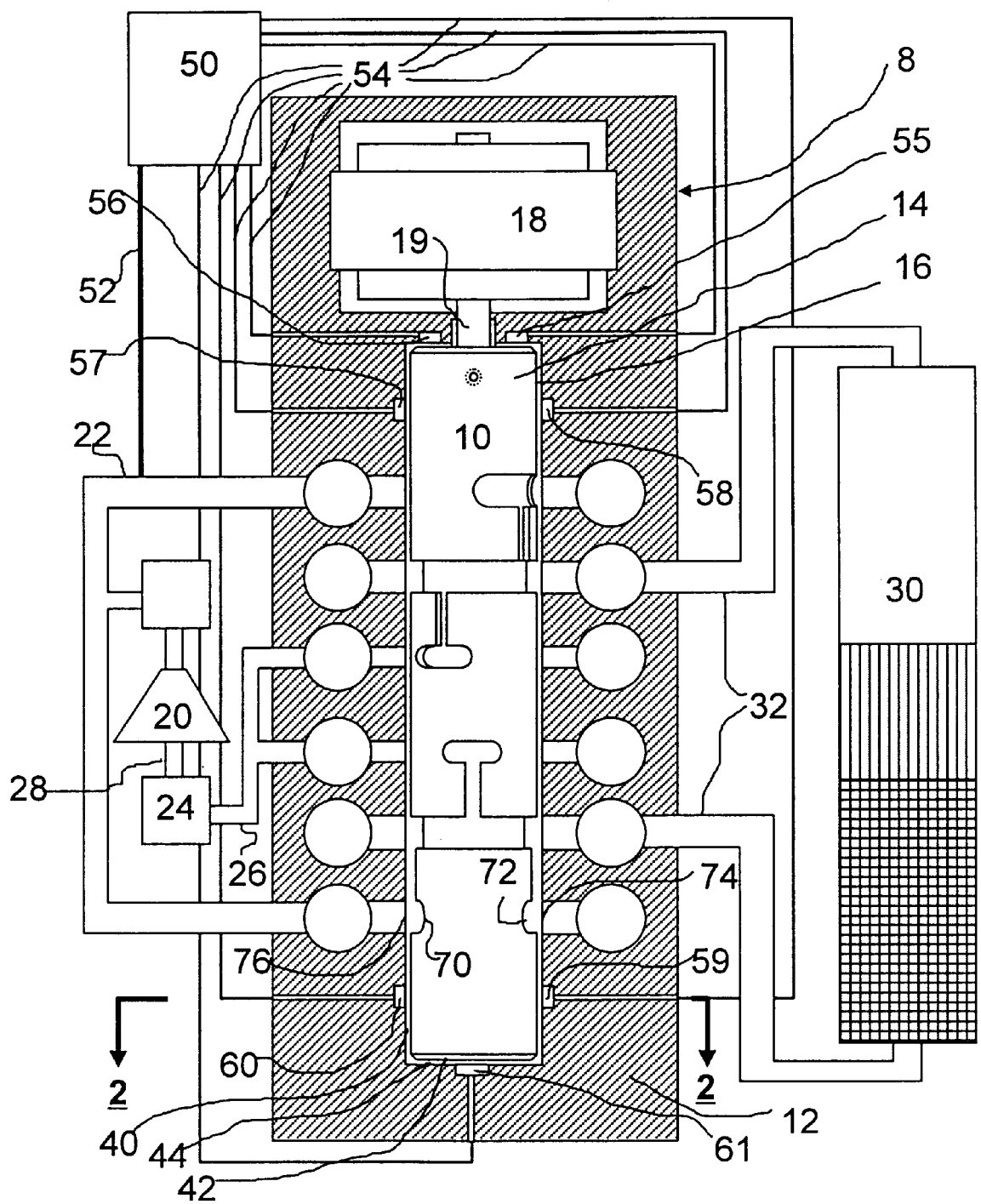
FIG. 1 is a side view in section illustrating the preferred embodiment of the present invention.
Figure 2:
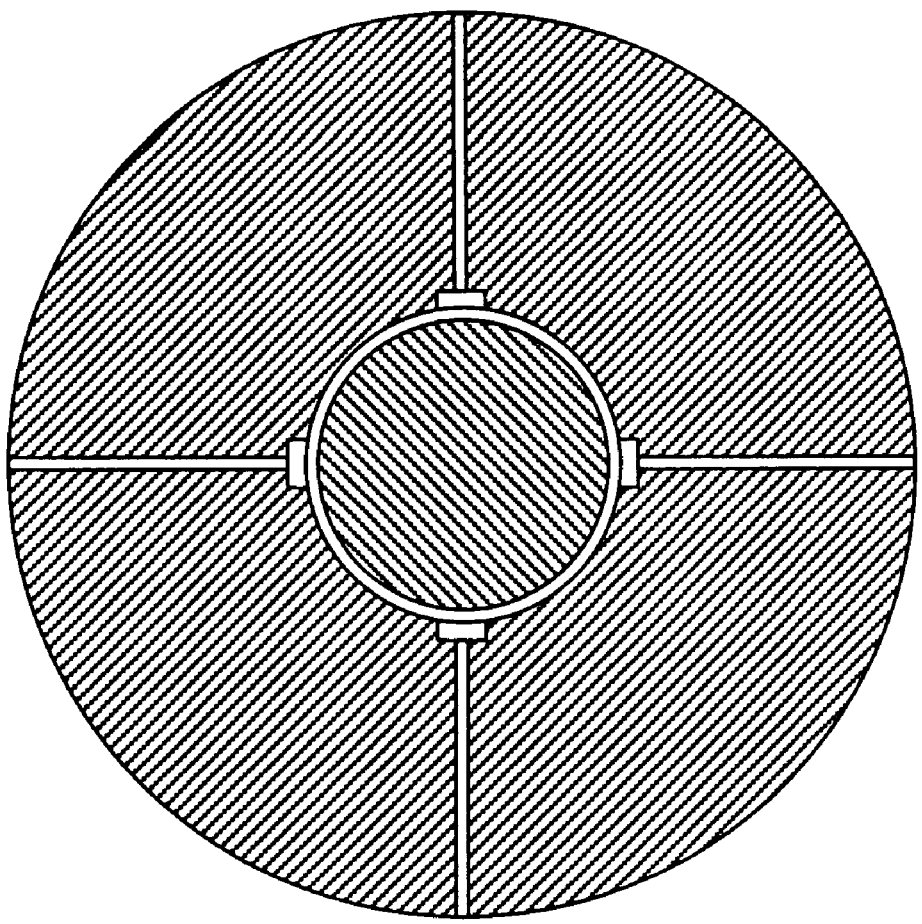
FIG. 2 is a top view in section through the line 2—2 of FIG. 1.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other passageways where such connection is recognized as being equivalent by those skilled in the art.

DETAILED DESCRIPTION

The preferred rotary valve 8, shown in FIG. 1, includes a piston 10 rotatably mounted within a housing 12. The piston wall 14 interfaces with a cylinder wall 16 of a cylindrical bore formed in the housing 12. The piston 10 is rotatably driven by a motor 18 rigidly fastened to the piston 10 at one longitudinal end. A pressure source, such as the compressor 20, is connected to a fluid line 22 which attaches to the housing 12 in a conventional manner. A fluid reservoir 24 is connected to the housing 12 via the fluid line 26, and fluid line 28 connects the compressor 20 to the reservoir 24. A machine which uses the pressurized fluid, such as the cryocooler 30, is connected to the housing 12 by the fluid lines 32.

The compressor 20, reservoir 24 and cryocooler 30 transport and convey a pressurized fluid, preferably a gas, in the conventional manner by operation of the rotary valve 8. As the piston 10 rotates, ports on the cylinder wall 16 register with passageways formed in the piston 10 directing the pressurized fluid from its predetermined source to its predetermined destination.

There is a clearance gap 40 formed between the piston wall 14 and the cylinder wall 16. During rotation of the piston 10, the clearance gap 40 can vary. In fact, the width of the clearance gap is considered variable because, in normal operation, the axis of the piston 10 will become eccentrically misaligned during motion, the misalignment occurring in the radial direction and in the longitudinal direction, due to forces such as gravity. If the piston wall 14 and the cylinder wall 16 come into contact with one another, substantial wear occurs. The clearance gap 40, between the longitudinal end wall 42 of the piston 10 and the longitudinal end wall of the housing 12, can also vary in width.

In order to avoid, or at least substantially decrease, the contact between the piston 10 and the housing 12, a fluid bearing is constructed according to the present invention. An accumulator chamber 50 is connected in fluid communication with the fluid line 22 connected to the compressor 20 with the fluid line 52. It is preferred that the fluid line 52 have a restriction or other resistance to the flow of fluid through the fluid line 52 into the accumulator chamber 50. This restriction produces a predetermined pressure in the accumulator chamber 50, under selected steady state operating conditions, which is lower than the compressor 20 outlet pressure to provide a desired operating pressure for the fluid bearing.

Multiple fluid flow passageways 54 extend from the accumulator chamber 50 to the cavities 55–61, which are shown in FIG. 1, and other similar cavities which are not visible from the view of FIG. 1. The passageways 54 have at least a portion of their length which has a restriction to the fluid flow. The passageways 54 preferably have very small cross-sectional area their entire length which serves as the flow resistance path. The passageways 54 communicate with the clearance gap 40 through the cavities 55–61, and others not shown in FIG. 1. The diameter of the passageways 54 is sufficiently small to provide a significant constant flow resistance to the flow of working fluid from the accumulator chamber 50 to the clearance gap 40. This permits the accumulator chamber 50 to be maintained at a desired pressure. The resistance in the passageways 54 allows the fluid to flow, but prevents all of the fluid from flowing out rapidly. This relatively constant fluid pressure is maintained in the chamber 50. The passageways 54 could alternatively be capillary tubes in which each capillary tube connects the accumulator chamber 50 with a cavity. As a further alternative, small metering orifices could be used in the passageways to establish the flow resistance.

The cavities 55–61 are formed in the cylinder wall 16 around the circumference of the piston 14 and are formed in the cylinder wall 44 at one longitudinal end of the housing 12 and in the cylinder wall 16 at the opposite longitudinal end of the housing 12. The cavities 55–61 are preferably spaced equiangularly around the circumference of the cylinder wall 16 and at opposite longitudinal cylinder wall ends. The cavity 61 is the only cavity in the cylinder wall 44, but a pair of cavities 55 and 56 are formed at the opposite longitudinal end in the cylinder wall 60, since the motor 18 and its drive shaft 19 prevent locating a cavity along the axis of the cylinder wall 16. The cavities formed on the circumferential surface of the cylinder wall 16 are preferably spaced every 90°, providing four cavities along a plane perpendicular to the axis of the piston 10. However, more than four cavities can be used, but it is preferred that they are spaced some integral portion of 360° around the circumference of the cylinder wall 16.

An important feature of the present invention, which is explained in more detail below, is that the flow resistance in the passageways 54 is related to the flow resistance through the interfacing clearance gap 40. The resistance to fluid flow through the fluid flow passageways 54 is within the range extending substantially from the minimum resistance to fluid flow through the interfacing clearance gap 40 to substantially the maximum resistance to fluid flow through the interfacing clearance gap 40. This maximum and minimum resistance to fluid flow relates to the positioning of the piston 10 at its minimum spacing from the cylinder wall 16 and its maximum spacing from the cylinder wall 16, respectively. This relationship between the resistances is discussed in further detail below, but the operation of the rotary valve 8 will first be described.

The piston 10 is rotated continuously by the motor 18. As the piston 10 rotates, the ports 70 and 72 on the piston 10 are momentarily registered with the ports 74 and 76 in the housing 12, allowing a high pressure fluid, preferably a gas, to pass from the compressor 20 to the cryocooler 30. This registration of the ports is conventional. While the piston 10 continues to rotate, a different set of ports on the piston 10 becomes registered momentarily with a set of ports in the cylinder wall 16, allowing the gas to expand from the cryocooler 30 and return to the compressor 20. The cavities 55–61, and those not shown in FIG. 1, prevent contact between the rotating piston 10 and the housing 12 during this rotation of the piston 10.

Since the gas pressure in the accumulator chamber 50 is significantly greater than the pressure in the clearance gap 40, the working gas, which is the same gas the compressor 20 pumps to the cryocooler 30 and back, flows constantly from the accumulator chamber 50 through the passageways 54 and into the cavities 55–61. The pressure of the gas at the cavities 55–61 is significantly lower than the pressure of the gas in the accumulator chamber 50 (due to the resistance to fluid flow through the passageways 54), and is at a pressure which is between the maximum and minimum pressure in the clearance gap 40. The pressure at the cavities 55–61 can be predetermined based on the pressure in the accumulator chamber 50 and the resistance in the passageways 54. From the cavities 55–61, pressurized gas flows first into the clearance gap 40, and then through the clearance gap 40 to the low pressure reservoir 24 at the port 77.

The piston is centered by the flow of gas through the clearance gap 40. If, at any time during its operation, the piston 10 becomes misaligned with the cylindrical bore wall 16 of the housing 12, either longitudinally or radially, a net force acts on the piston 10 to realign it. This force is effected in the following manner. As the clearance gap on one side of the piston 10 decreases, the clearance gap on the diametrically opposite side of the piston 10 increases. For example, if the width of the clearance gap at the cavity 59 of FIG. 1 decreases, the width of the clearance gap at the cavity 60 increases. This decrease in the cross-sectional area of the flow path from the cavity 59 through the clearance gap 40 causes an increase in the flow resistance to gas flowing through the clearance gap 40 from the cavity 59. The corresponding increase in flow path area on the opposite side of the piston 10 causes a decrease in the flow resistance to gas flowing through the increased width clearance gap 40 from the cavity 60.

When the resistance to gas flow from the cavity 59 increases, the pressure of the gas in the cavity 59 increases, causing a greater force to be applied against the surfaces containing the pressure, and thereby forcing the piston 10 away from the wall of the housing 12 at the cavity 59. Conversely, when the resistance to gas flow through the clearance gap on the opposite side of the piston 10 decreases, the pressure of the gas in the cavity 60 decreases, decreasing the force that urges the piston 10 away from the wall of the housing at the cavity 60. This pressure increase on one side and pressure decrease on the opposite side of the piston 10 provides a change in net force on the piston 10, in this example in the leftward direction in FIG. 1, tending to realign the piston in alignment with the cylindrical bore wall 16 of the housing 12. Consequently, a radial centering equilibrium condition is established. A similar longitudinal centering equilibrium occurs, due to the cavities 55, 56 and 61. After the gas flows out of the cavities and into the clearance gap 40, it flows longitudinally through the clearance gap 40 back to the port 77 which returns the gas to the reservoir 24 to be recirculated.

It is possible to form only one pair of cavities spaced on opposite circumferential sides of the piston. The problem arises, however, that if the two cavities are spaced oppositely from one another, the piston may be misaligned in a direction perpendicular to a line connecting the two cavities. The width of the clearance gaps of the two opposing cavities may not change unequally, but the gap width along the perpendicular will. Therefore, the minimum number of cavities that is desirable is three, where the three cavities are spaced generally at 120° intervals around the circumference of the piston. In this case, motion in any radial direction will always result in a changed width gap for at least two cavities and therefore, result in restoring forces. It is even more desirable to have one of these "triads" of cavities near each longitudinal end of the piston. It is, however, more preferred that four or more cavities are spaced equidistant around the circumference of the piston, near both ends of the piston.

There is an important relationship between the resistance to gas flow through the clearance gap, and the resistance to gas flow through the fixed resistance fluid passageways 54 connecting the accumulator chamber 50 to the clearance gap 40. The resistance to the flow of gas through the clearance gap 40 is distributed, and has the additional characteristic that, since the width of the clearance gap 40 can change, the resistance to the flow of fluid through the clearance gap 40 can change as well, between a maximum and a minimum. The resistance to gas flow through the fluid passageways 54 is preferably substantially less than the maximum resistance to the flow of gas through the clearance gap 40, and it is also preferably substantially greater than the minimum resistance to flow of the gas through the clearance gap 40. Most preferably, the resistance to gas flow through the passageways 54 is intermediate the maximum and minimum, near the middle. The maximum and minimum resistances to gas flow through the clearance gap 40 occur when the piston wall 14 is closest to, and farthest from, respectively, the cylinder wall 16.

Figure 3:
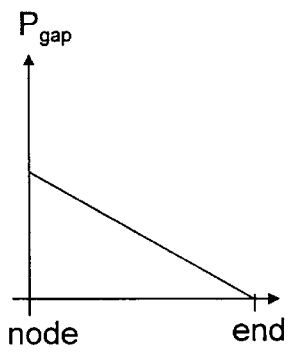
FIG. 3 is a graph illustrating pressure versus distance.

This relationship of the flow resistance maximizes the net restoring force moving the piston towards its centered position (radially and longitudinally) whenever it strays from the centered position, and may be explained with reference to FIGS. 3, 4 and 5. FIG. 3 illustrates the pressure distribution along the portion of the interfacing clearance gap 40 through which the lubricating stream flows in the absence of a cavity. The pressure reaches a maximum at the "node", which is where the fluid passageway intersects the clearance gap. The pressure also reaches a minimum, identified as the "end", at the end of the lubricating fluid flow through the clearance gap, which in the embodiment of FIG. 1 is at the port 77, where the fluid returns to the reservoir 24. The restoring or centering force on the piston resulting from this distributed and varying pressure is the integral of pressure over the surface area of the piston upon which the pressure acts, from the node to the end. This force is therefore represented by the area under the curve.

Figure 4:
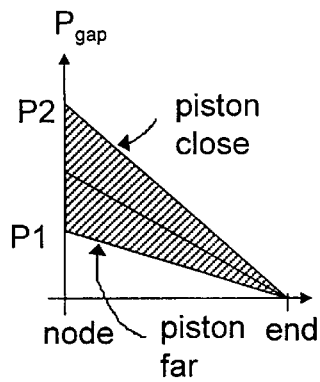
FIG. 4 is a graph illustrating pressure versus distance.
Figure 5:
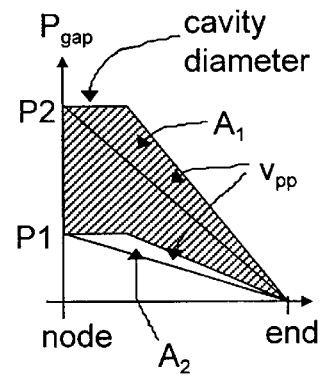
FIG. 5 is a graph illustrating pressure versus distance.

FIG. 4 illustrates two such curves, representing the pressure distribution on the opposite sides of the piston when the piston is moved from its centered, coaxial position. The node on the side of the piston which is closest to the housing wall, i.e. the side having the minimum clearance gap, will have a pressure $P_2$ at the node, while the opposite side will have a considerably lower pressure $P_1$. Because the forces resulting from these pressures are oppositely directed on the opposite sides, the area between the two curves, shown cross-hatched, represents the net restoring force. Consequently, it is desirable to maximize $P_2$ and minimize $P_1$ to maximize the differential pressure on opposite sides of the piston, and therefore maximize the restoring force.

The fluid essentially flows through two series flow resistances, one is the fixed flow resistance passageways 54 and the other is the clearance gap 40. The pressures $P_1$ and $P_2$ represent the pressure at the node intermediate these two flow resistances. The node pressure can be minimized when the clearance gap distance is maximized if the fixed resistance of the flow passageway 54 is much greater than the flow resistance of the clearance gap 40 when the clearance gap 40 is maximum. Similarly, the node pressure can be maximized if the flow resistance of the fluid passageway 54 is much less than the flow resistance of the clearance gap 40 when the clearance gap 40 is at a minimum distance. This is most nearly accomplished by constructing the fluid passageway 54 to have a fluid flow resistance intermediate the maximum and minimum flow resistance of the clearance gap 40. It is best approximated by having the flow resistance within the range extending from approximately the minimum clearance gap flow resistance to approximately the maximum clearance gap flow resistance.

An electrical analogy to the present invention comprises two electrical resistors in series, where one resistor is fixed (analogous to the fixed flow resistance passageway 54), and one resistor is variable (analogous to the variable width clearance gap 40). The current (analogous to fluid flow of the lubricating stream) flows through the fixed resistance and the variable resistance. If the variable resistance is much greater than the fixed resistance, most of the voltage drop will occur across the variable resistance and very little voltage drop will occur across the fixed resistance. If the opposite situation occurs and the variable resistance is much less than the fixed resistance, then the voltage drop occurs mostly across the fixed resistance and very little voltage drop occurs across the variable resistance. Voltage drop is analogous to pressure, where a large voltage drop is analogous to a large pressure.

Although it is preferred that the fixed resistance is approximately intermediate the maximum and minimum values of the variable resistance, the present invention still provides substantial restoring force even if the fixed resistance is only slightly higher than the minimum, or slightly lower than the maximum resistance of the variable width clearance gap. Additionally, if a range of resistance values is constructed extending from substantially the minimum resistance to substantially the maximum resistance to gas flow through the clearance gap, then the fixed resistance may merely lie somewhere within that range. Substantially the minimum and substantially the maximum resistance values means a resistance value lying near the maximum or minimum resistance values, and may include resistance values slightly above the maximum and slightly below the minimum.

The cavities 55–61, and other cavities not shown in FIG. 1, serve two important functions. The first function is to increase the area upon which the pressures $P_1$ and $P_2$ of FIGS. 3 and 4 are exerted to thereby increase the net restoring force. Thus, as seen in FIG. 5, the area of the node, and therefore the area subjected to the node pressure $P_1$ and $P_2$, is increased by forming the cavities. The increase in force on the higher pressure side is considerably greater than the increase in force on the low pressure side, as illustrated by FIG. 5, by the fact that the area A1 representing the increase in force on the high pressure side is considerably larger than the pressure A2 representing the increase in force on the low pressure side.

This function of the cavities is determined by their area under quasistatic conditions, i.e. in response to quasistatic loads such as the weight of the piston.

The second function of the cavities is to control the frequency response of the bearing system. This function is determined by cavity volume. In this function, a cavity is a molecular capacitor from the node to ground. As such, it stores molecules to govern the rate of change in pressure at the node, thereby influencing the frequency response of the system.

Figure 6:
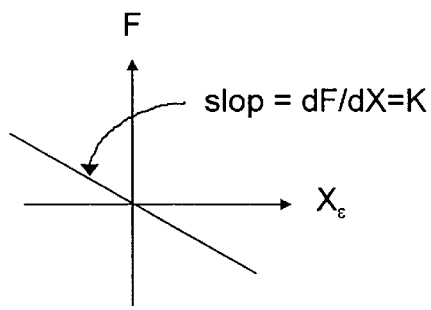
FIG. 6 is a graph illustrating force versus distance.
Figure 7:
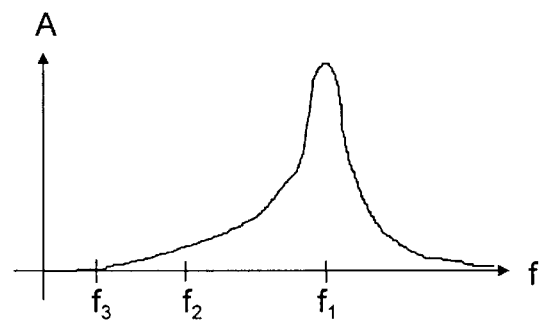
FIG. 7 is a graph illustrating amplitude versus frequency.

It is desirable to control a frequency response of the bearing system because it has a natural frequency in the diametrical and longitudinal directions. Excitation would lead to the piston banging back and forth across the cylinder wall 16 at that natural frequency. FIG. 6 shows the force exerted by a node as a function of piston eccentricity toward or away from the node. The derivative of this force-distance relationship is a spring constant, k. This spring constant and the mass, m, of the piston define a natural frequency at $f_1 = 2\pi(k/m)^{1/2}$. FIG. 7 shows the amplitudes of motion resulting from excitations at various frequencies in the absence of cavities. The peak amplitude at resonance is limited only by viscous damping at the natural frequency of the bearing system. This damping may be insufficient to prevent contact between the piston wall and the housing wall.

The molecular capacitance of the cavity is C=V/RT, where V=cavity volume, R=the gas constant, and T=absolute temperature. If the piston is instantaneously displaced eccentrically away from a cavity, the pressure of the cavity does not decline instantaneously because time is required for its contents to flow out through the clearance gap. Similarly, an instantaneous displacement of the piston toward a cavity does not cause an instantaneous increase in cavity pressure, because time is required for gas to flow through the passageway to fill the cavity. The cavity capacitance and the equivalent resistance of the parallel combination of the passageway and gap resistance, $R_{eq} = (R_p^{-1} + R_g^{-1})^{-1}$, define a frequency, $f_2 = \frac{1}{2}\pi R_{eq} C$, above which the cavity pressure responds too slowly for displacements to cause changes in pressure, and therefore in force. Thus, $f_2$ is the upper frequency at which the mechanism can generate restoring forces in response to eccentric displacements of the piston. By appropriately selecting cavity volume, $f_2$ is made much less than $f_1$ and therefore the mechanism is unable to generate forces that might excite oscillations at $f_1$. The term "quasistatic" is now understood to mean "at frequencies below $f_2$". The bearing must be carefully designed so that $f_2$ is greater than all frequencies of lateral and/or longitudinal excitation expected to occur in operation, including $f_3$, the frequency of axial reciprocation of the piston.

A rotary valve for pulse tube cryocoolers has been constructed utilizing the principles of the present invention. The relevant dimensions are given below. "Capillary" refers to the restrictive portion of the fluid passageway which is the portion which establishes essentially all of the flow resistance of the fluid passageway.

Dimension:

| Dimension: | |
| --- | --- |
| Piston Diameter | 25mm |
| Diametrical Clearance | 0.02mm |
| Piston Length | 135mm |
| Capillaries Diameter | 0.2mm |
| Length | 150mm |
| Cavities Diameter | 4mm |
| Depth | 1mm |
| Number | 11 |

While certain preferred embodiments of the present invention have been disclosed in detail, it is to be understood that various modifications may be adopted without departing from the spirit of the invention or scope of the following claims.

I claim:

1. An improved rotary valve for controlling the flow of a gas from a gas pressure source, the valve including a piston rotatable mounted within a cylindrical bore formed in a housing and an interfacing clearance gap between a piston wall and a cylinder wall, wherein the improvement is a piston centering structure comprising:

(a) a gas flow passageway connected to the gas pressure source; and (b) a plurality of circumferentially discrete cavities formed in the cylinder wall, each of said cavities communicating with the gas in the gas flow passageway and opening into a circumferentially discrete portion of the clearance gap for pumping the gas from the gas pressure source through the gas flow passageway, out of the cavities and into and through the clearance gap;

wherein the clearance gap has a minimum and a maximum resistance to gas flow, and the gas flow passageway has a resistance to gas flow within a range extending from substantially the minimum resistance to gas flow through the clearance gap to substantially the maximum resistance to gas flow through the clearance gap.

2. A valve in accordance with claim 1, wherein said cavities are formed on substantially opposite circumferential surfaces of the cylinder wall.

3. A valve in accordance with claim 2, further comprising additional cavities formed on opposite, longitudinal end surfaces of the cylinder wall, and connected to the gas flow passageway for communicating with the gas in the gas flow passageway.

4. A valve in accordance with claim 3, wherein the flow resistance through the gas flow passageway is substantially intermediate the minimum and the maximum flow resistance through the clearance gap.

5. A valve in accordance with claim 1, wherein a gas accumulator chamber is interposed between the pressure source and the cavities, in fluid communication with both.

6. A valve in accordance with claim 2, wherein multiple cavities are formed on the circumferential surfaces of the cylinder wall, spaced equiangularly around the cylinder wall.

7. A valve in accordance with claim 6, wherein four cavities are formed on the circumferential surfaces of the cylinder wall, spaced at 90° intervals around the cylinder wall near a first end of the cylinder wall, and four cavities are formed on the circumferential surfaces of the cylinder wall, spaced at 90° intervals around the cylinder wall near an opposite, second longitudinal end of the cylinder wall.

* * * * *